United States Patent
Zhang et al.

(10) Patent No.: US 9,960,834 B2
(45) Date of Patent: May 1, 2018

(54) METHODS, DEVICES AND SYSTEMS FOR INCREASING WIRELESS COMMUNICATION RANGE

(71) Applicant: CASSIA NETWORKS INC., San Jose, CA (US)

(72) Inventors: Kunpeng Zhang, Beijing (CN); Fuyong Zhao, San Jose, CA (US)

(73) Assignee: CASSIA NETWORKS INC., San Jose, CA (US)

( * ) Notice: Subject to any disclaimer, the term of this patent is extended or adjusted under 35 U.S.C. 154(b) by 0 days. days.

(21) Appl. No.: 15/450,534

(22) Filed: Mar. 6, 2017

(65) Prior Publication Data

US 2017/0180034 A1    Jun. 22, 2017

Related U.S. Application Data

(62) Division of application No. 15/276,424, filed on Sep. 26, 2016, which is a division of application No. 14/639,711, filed on Mar. 5, 2015.

(Continued)

(51) Int. Cl.
*H04B 7/155* (2006.01)
*H04W 88/10* (2009.01)
(Continued)

(52) U.S. Cl.
CPC ........... *H04B 7/15507* (2013.01); *H04B 1/44* (2013.01); *H04B 17/318* (2015.01);
(Continued)

(58) Field of Classification Search
CPC ......... H04W 24/00; H04W 16/12; H04B 7/14
(Continued)

(56) References Cited

U.S. PATENT DOCUMENTS 5,408,197 A    4/1995  Miyake
5,513,382 A *  4/1996  Agahi-Kesheh ......... H04B 1/48
                                                    333/103

(Continued)

FOREIGN PATENT DOCUMENTS

WO    2014082665    6/2014

OTHER PUBLICATIONS

International Application No. PCT/US2016/015105, International Preliminary Report on Patentability dated Aug. 1, 2017.

(Continued)

*Primary Examiner* — Edward Urban
*Assistant Examiner* — Ralph H Justus

(57) ABSTRACT

A device for supporting wireless communication is provided. The device includes a transceiver, an antenna, and a radio frequency (RF) front end system communicatively coupled to the transceiver and the antenna. The RF front end system may include: a RF sampling block coupled to the transceiver and configured to sample signals received from the transceiver and output voltage signals; a RF switching logic coupled to the RF sampling block to receive the voltage signals and configured to switch the front end RF system between a transmitting mode and a receiving mode; a RF transmission gain block coupled to the RF switching logic and configured to increase a transmission power of the signals received from the transceiver; and a RF receiving gain block coupled to the RF switching logic and configured to remove noise signals contained in radio frequency signals received from the antenna.

18 Claims, 11 Drawing Sheets

Related U.S. Application Data

(60) Provisional application No. 62/110,250, filed on Jan. 30, 2015, provisional application No. 62/110,262, filed on Jan. 30, 2015.

(51) Int. Cl.
| | | |
|---|---|---|
| *H04W 4/00* | (2018.01) | |
| *H04B 1/44* | (2006.01) | |
| *H04L 29/12* | (2006.01) | |
| *H04W 8/24* | (2009.01) | |
| *H04B 17/318* | (2015.01) | |
| *H04W 92/18* | (2009.01) | |
| *H04W 84/12* | (2009.01) | |

(52) U.S. Cl.
CPC ......... *H04L 61/6022* (2013.01); *H04W 4/008* (2013.01); *H04W 4/80* (2018.02); *H04W 8/24* (2013.01); *H04W 84/12* (2013.01); *H04W 88/10* (2013.01); *H04W 92/18* (2013.01)

(58) Field of Classification Search
USPC .................. 455/16, 13.1, 11.1, 552.1–553.1; 370/252; 343/861
See application file for complete search history.

(56) References Cited

U.S. PATENT DOCUMENTS

| | | | |
|---|---|---|---|
| 5,521,561 A * | 5/1996 | Yrjola | H01P 1/15 333/103 |
| 5,689,817 A | 11/1997 | Fok | |
| 6,054,896 A * | 4/2000 | Wright | H03F 1/0294 330/149 |
| 6,097,703 A | 8/2000 | Larsen | |
| 6,236,622 B1 | 5/2001 | Blackman | |
| 6,404,386 B1 | 6/2002 | Proctor | |
| 7,363,003 B2 | 4/2008 | Takatani | |
| 8,433,242 B2 * | 4/2013 | Kenington | H01Q 3/26 455/25 |
| 9,264,907 B2 * | 2/2016 | Laroia | H04W 16/12 |
| 2001/0012757 A1 | 8/2001 | Boyle | |
| 2001/0014911 A1 | 8/2001 | Doi | |
| 2002/0028655 A1 * | 3/2002 | Rosener | H04B 7/2606 455/16 |
| 2003/0214437 A1 * | 11/2003 | Rawnick | H01Q 9/0414 343/700 MS |
| 2005/0070329 A1 | 3/2005 | Lection | |
| 2005/0088980 A1 | 4/2005 | Olkkonen | |
| 2005/0212708 A1 * | 9/2005 | Fifield | H01Q 9/0421 343/702 |
| 2005/0248962 A1 | 11/2005 | Searfoss | |
| 2007/0041344 A1 | 2/2007 | Yaqub | |
| 2007/0188358 A1 | 8/2007 | Somayajula | |
| 2007/0222697 A1 * | 9/2007 | Caimi | H01Q 1/243 343/861 |
| 2008/0043996 A1 | 2/2008 | Dolph | |
| 2009/0011726 A1 * | 1/2009 | Nishimura | H04B 1/082 455/120 |
| 2009/0147884 A1 | 6/2009 | Guruswami Sridharan | |
| 2009/0303387 A1 | 12/2009 | Chen | |
| 2010/0103316 A1 | 4/2010 | Colsey | |
| 2010/0303244 A1 | 12/2010 | Kim | |
| 2010/0315225 A1 | 12/2010 | Teague | |
| 2011/0021142 A1 | 1/2011 | Desai | |
| 2011/0028093 A1 | 2/2011 | Patel | |
| 2011/0117842 A1 | 5/2011 | Hong | |
| 2011/0142413 A1 | 6/2011 | Kang | |
| 2011/0215971 A1 * | 9/2011 | Rao | H01Q 1/243 343/702 |
| 2011/0249596 A1 * | 10/2011 | Ross | H04L 5/14 370/276 |
| 2012/0057518 A1 | 3/2012 | Herrala | |
| 2012/0116548 A1 | 5/2012 | Goree | |
| 2012/0326942 A1 | 12/2012 | Simmons | |
| 2013/0017816 A1 | 1/2013 | Talty | |
| 2013/0033996 A1 * | 2/2013 | Song | H04B 7/0808 370/252 |
| 2013/0045684 A1 | 2/2013 | Linde | |
| 2013/0148020 A1 | 6/2013 | Cook | |
| 2013/0154897 A1 * | 6/2013 | Sorensen | H01Q 7/005 343/861 |
| 2013/0254159 A1 | 9/2013 | Thramann | |
| 2014/0006947 A1 | 1/2014 | Garmark | |
| 2014/0041038 A1 | 2/2014 | Lessin | |
| 2014/0105054 A1 | 4/2014 | Saegrov | |
| 2014/0119407 A1 | 5/2014 | Miller | |
| 2014/0169599 A1 | 6/2014 | Solum | |
| 2014/0181683 A1 | 6/2014 | Lim | |
| 2014/0207489 A1 | 7/2014 | Wartena | |
| 2014/0213197 A1 | 7/2014 | An | |
| 2014/0287704 A1 | 9/2014 | Dupuy | |
| 2014/0327578 A1 | 11/2014 | Rowson | |
| 2014/0370811 A1 | 12/2014 | Kang | |
| 2015/0031288 A1 | 1/2015 | Tubbesing | |
| 2015/0095170 A1 | 4/2015 | Lang | |
| 2015/0105022 A1 | 4/2015 | Jung | |
| 2015/0105880 A1 | 4/2015 | Slupik | |
| 2015/0234372 A1 | 8/2015 | Slupik | |
| 2015/0278215 A1 | 10/2015 | Lee | |
| 2015/0351145 A1 | 12/2015 | Burks | |
| 2016/0063778 A1 | 3/2016 | Bruns | |
| 2016/0065295 A1 * | 3/2016 | Stanescu | H04B 17/29 375/133 |
| 2016/0119438 A1 | 4/2016 | Abramson | |
| 2016/0154392 A1 | 6/2016 | Jo | |
| 2016/0157048 A1 | 6/2016 | Kerai | |
| 2016/0258617 A1 | 9/2016 | Wang | |

OTHER PUBLICATIONS

International Application No. PCT/US2016/015124, International Preliminary Report on Patentability dated Aug. 1, 2017.
International Application No. PCT/US2016/015617, International Preliminary Report on Patentability dated Aug. 1, 2017.
International Application No. PCT/US2016/015124, International Search Report and Written Opinion dated May 26, 2016.
International Application No. PCT/US2016/015617, International Search Report and Written Opinion dated Apr. 21, 2016.
International Application No. PCT/US2016/015105, International Search Report and Written Opinion dated Jun. 3, 2016.
Non-Final Office Action for U.S. Appl. No. 14/919,124, dated Oct. 7, 2016, 14 pages.
Non-Final Office Action for U.S. Appl. No. 14/930,307, dated Oct. 20, 2016, 15 pages.
Non-Final Office Action for U.S. Appl. No. 15/450,534, dated Apr. 7, 2017, 8 pages.
Final Office Action for U.S. Appl. No. 14/919,124, dated Apr. 7, 2017, 13 pages.
Final Office Action for U.S. Appl. No. 14/789,614, dated Oct. 14, 2016, 16 pages.
Non-Final Office Action for U.S. Appl. No. 14/639,711, dated Jun. 17, 2016, 15 pages.
Non-Final Office Action for U.S. Appl. No. 15/276,424, dated Mar. 24, 2017, 14 pages.
Final Office Action for U.S. Appl. No. 15/276,424, dated Sep. 22, 2017, 14 pages.
Non-Final Office Action for U.S. Appl. No. 14/919,124, dated Nov. 2, 2017, 13 pages.

* cited by examiner

700

Table Life Time I

| Antenna Config 1 | Antenna Config 2 | Antenna Config 3 | ......... | Antenna Config N |
|---|---|---|---|---|
| RSSI Client A | RSSI Client A | RSSI Client A | RSSI Client A | RSSI Client A |
| RSSI Client B | RSSI Client B | RSSI Client B | RSSI Client B | RSSI Client B |
| RSSI Client C | RSSI Client C | RSSI Client C | RSSI Client C | RSSI Client C |
| RSSI Client D | RSSI Client D | RSSI Client D | RSSI Client D | RSSI Client D |
| .... | .... | .... | .... | .... |
| RSSI Client X | RSSI Client X | RSSI Client X | RSSI Client X | RSSI Client X |

FIG. 7

METHODS, DEVICES AND SYSTEMS FOR INCREASING WIRELESS COMMUNICATION RANGE

CROSS REFERENCE TO RELATED APPLICATIONS

This application is a divisional application of U.S. application Ser. No. 15/276,424, filed on Sep. 26, 2016, which is a divisional application of U.S. application Ser. No. 14/639,711, filed on Mar. 5, 2015. U.S. application Ser. No. 14/639,711 is based on and claims priority to U.S. Provisional Application No. 62/110,250, filed Jan. 30, 2015, entitled "METHODS, DEVICES AND SYSTEMS FOR INCREASING WIRELESS COMMUNICATION RANGE," and U.S. Provisional Application No. 62/110,262, filed Jan. 30, 2015, entitled "BLUETOOTH TRANSPARENT RELAY." The entire contents of the above referenced applications are all incorporated herein by reference.

TECHNICAL FIELD

This disclosure relates generally to a field of wireless communication and, more particularly, to methods, devices, and systems for increasing wireless communication range.

BACKGROUND

Bluetooth devices such as Bluetooth speakers, smart phones, smart locks, and various smart Bluetooth sensors and wearable devices, have become widely used in many applications. As Bluetooth technology is designed for low power and low cost operation, the communication range of Bluetooth devices is typically quite short. For example, the typical communication range between two Bluetooth devices, such as a smart phone and a Bluetooth Low Energy (BLE) sensor, is limited to tens of meters in open space and a few meters inside a house, and the Bluetooth transmission typically cannot penetrate walls. The short communication range limits the use of Bluetooth devices in scenarios where longer communication range is required.

Conventional schemes to increase wireless communication range typically involve increasing the transmission power or antenna gain on both sides of the radio frequency transmission. However, for Bluetooth devices, especially the BLE sensors and wearable devices, increasing the transmission power or antenna gain of the devices is often impractical and would defeat the design goal of low power and low cost Bluetooth devices. Thus, it is desired to extend the communication range of Bluetooth devices without having to increase the transmission power or production cost of the Bluetooth devices.

BRIEF DESCRIPTION OF THE DRAWINGS

The accompanying drawings, which constitute a part of this specification, illustrate several embodiments and, together with the description, serve to explain the disclosed principles.

FIG. 7 illustrates an exemplary table of received signal strength indicators (RSSIs) for selecting an antenna configuration, in accordance with an embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is intended that the following detailed description be considered as exemplary only, with the true scope and spirit being indicated by the following claims.

The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1:
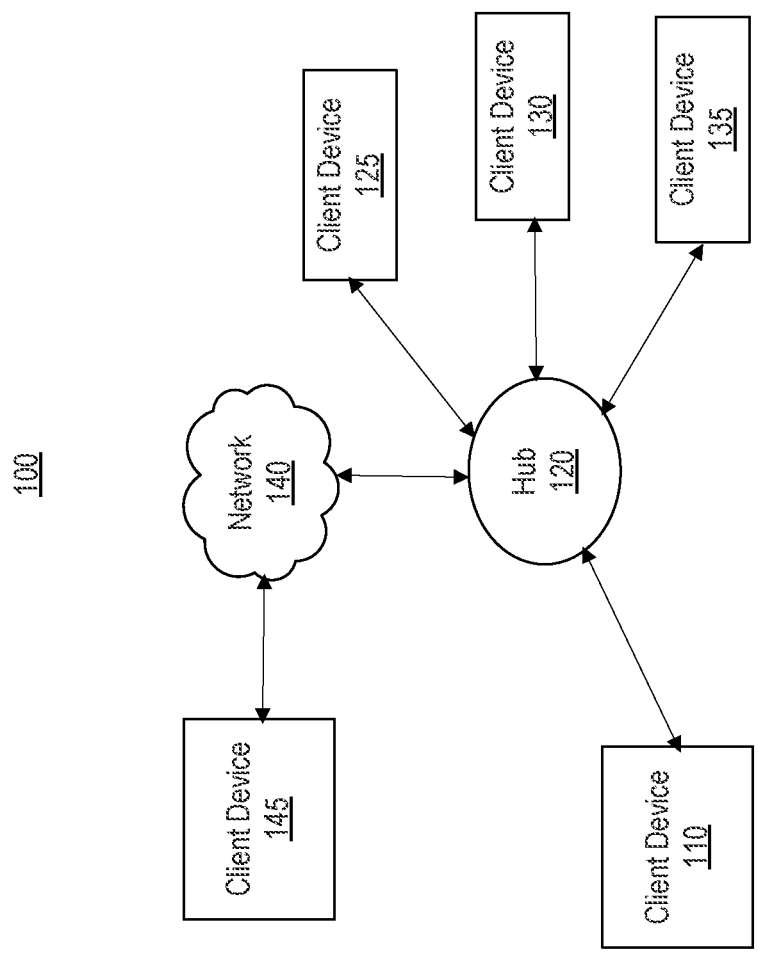
FIG. 1 illustrates an exemplary system environment for implementing methods and systems consistent with the present disclosure.

FIG. 1 illustrates an exemplary system environment 100 for implementing methods and systems consistent with the present disclosure. The system environment 100 shown in FIG. 1 includes a hub 120 and client devices 110, 125, 130, 135, and 145. In some embodiments, the system environment 100 may also include a network 140 that allows the client devices to remotely communicate with the hub 120. As shown in FIG. 1, the client devices are connected to the hub 120 through wireless communication links. For example, the client devices may be Bluetooth devices or Bluetooth sensors that communicate to the hub 120 using Bluetooth communication protocol. The client devices may also communicate to the hub 120 using other wireless communication protocol, e.g., ZigBee, WiFi, etc. When wireless communications are to be established between the client devices, the hub 120 may receive radio signal from one client device (e.g., client device 110), process the received signal, and send corresponding radio signal to the other client device (e.g., client device 125), such that client devices may communicate with each other through the hub 120. In some embodiments, the hub 120 may amplify the received signal and/or suppress noise in the received signal from the client devices such that communication range between client devices can be effectively increased.

In some embodiments, the client devices may be Bluetooth devices or sensors (or other wireless devices such as WIFI devices, Zigbee devices, etc.), and the hub 120 may be used to increase the communication range between the client devices. Bluetooth devices operate in one of two modes: as a master device or a slave device. The master device provides a network clock and determines the frequency hopping sequence, and the slave devices synchronize to the master's clock and follow the master's hopping frequency. Each of the client devices shown in FIG. 1 may be a master device or slave device. For example, the client device 110 may be a master device and client devices 125, 130, and 135 may be slave devices. As an example, Bluetooth master device may be a cellular phone, a tablet, a computer, a laptop, a smart watch, a TV, or other Bluetooth devices with screens and operating systems. Bluetooth slave devices may be speakers, headsets, microphones, printers, smart watches, cameras, TVs, monitors, wearable devices including wristbands, pedometers, activity trackers, sleep trackers, weight scales, etc., or devices to which Bluetooth sensors are attached to sense and send relevant electric parameters, such as home appliance including washing machines, vacuum cleaners, refrigerators, ovens, microwaves, etc.

In some embodiments, the client devices may communicate with the hub 120 through a network 140. For example, as shown in FIG. 1, the client device 145 may remotely communicate with the hub 120 and/or other client devices via the network 140. The network 140 may be any type of network that provides communications, exchanges information, and/or facilitates the exchange of information between the hub 120 and client devices. In one embodiment, the network 140 may be the Internet, a Local Area Network, a cellular communication network, a wireless local area network, or other suitable connections that allow the client devices to send and receive information to/from the hub 120. In some embodiments, the hub 120 may be included in a remote cloud-based network system that can be accessed by the client devices through the network 140.

The present disclosure provides a wireless hub that can be used to effectively increase the wireless communication range between the client devices. The wireless hub may support long range transmission without requiring modification of the wireless client devices. The wireless hub may function as a transparent relay that the client devices may not necessary be aware of. In some embodiments, the wireless hub may be a Bluetooth hub and support all the public profiles of Bluetooth. It is also possible to control the wireless hub through a cloud server, for example, by using a smart phone application. Furthermore, the wireless hub may be configured to connect to a cloud server and capable of adaptively reconfigure itself based on the use history, interaction, and/or activities of the client devices and the wireless hub. It should be noted that the hub 120 may also be called as a router, and in this disclosure, the terms of hub and router are inter-exchangeable.

In the following description, Bluetooth protocols and devices are used to illustrate the design of the wireless hub. It should be understood, however, that similar constructions of the wireless hub can be applied to scenarios where other wireless communication protocols are used without departing from the spirit and scope of the present disclosure.

Figure 2:
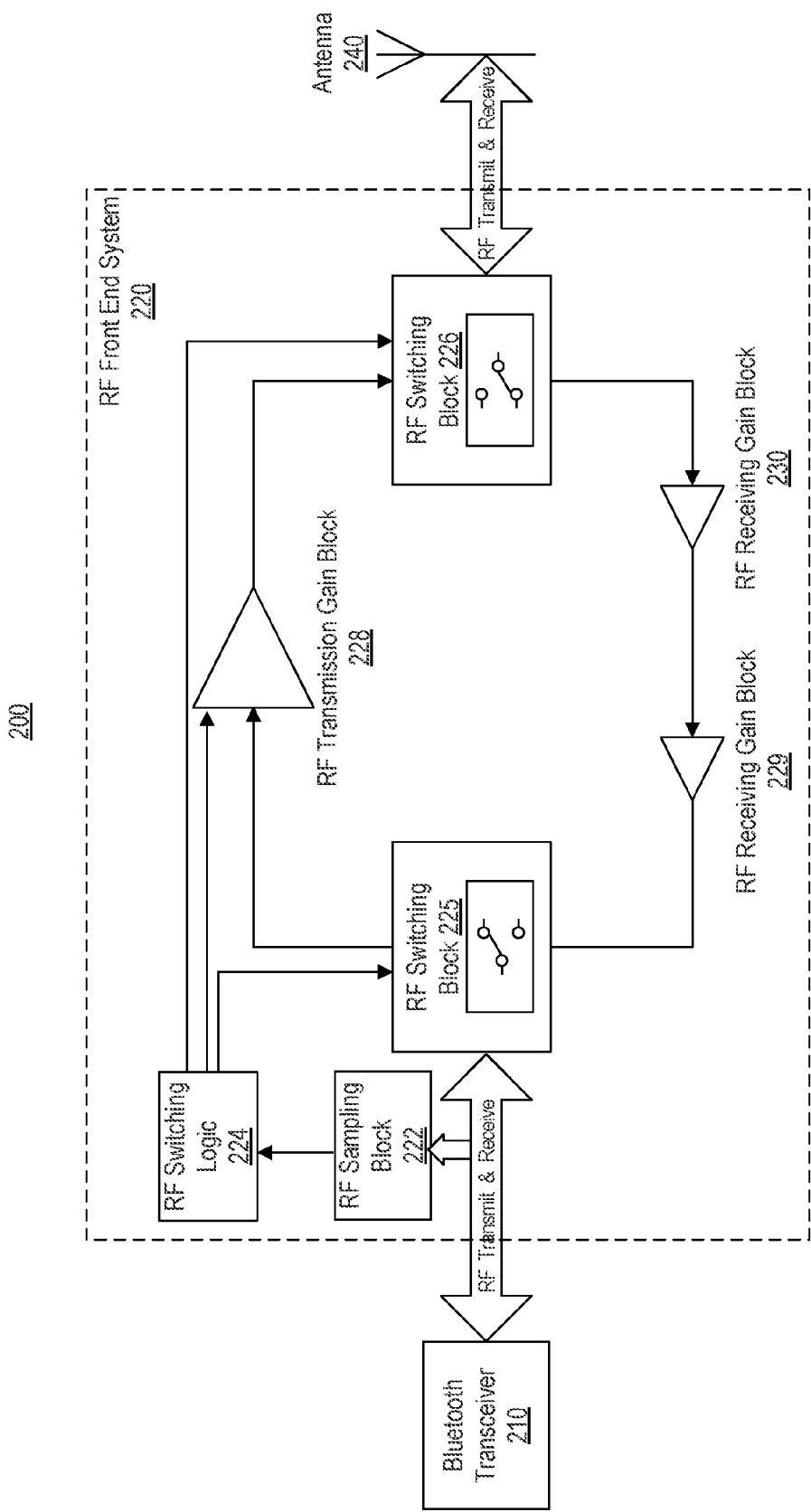
FIG. 2 illustrates an exemplary block diagram of a Bluetooth hub, in accordance with an embodiment of the present disclosure.

FIG. 2 illustrates an exemplary block diagram of a Bluetooth hub 200, in accordance with an embodiment of the present disclosure. As shown in FIG. 2, the Bluetooth hub 200 may include a Bluetooth transceiver 210, a RF front end system 220, and an antenna 240. The Bluetooth transceiver 210 may be configured to transmit and receive Bluetooth signals to/from Bluetooth devices. The Bluetooth transceiver 210 may include digital, analog, and radio frequency (RF) functions for generating, receiving, and encoding/decoding Bluetooth signals. The antenna 240 may convert RF Bluetooth signals to electromagnetic waves, and vice versa. The antenna 240 may include a reconfigurable antenna system or directional antenna system described later in connection with FIG. 5 and FIG. 8, respectively. The Bluetooth hub 200 may also include other components, such as a processor coupled to the Bluetooth transceiver 210. The Bluetooth hub 200 may further includes means to connect to the Internet, for example, an Ethernet port or a WIFI module. The Bluetooth hub 200 may also be connected to the Internet via the Bluetooth transceiver 200.

The RF front end system 220 is communicatively coupled to the Bluetooth transceiver 210 and the antenna 240. The RF front end system 220 may improve RF performance of the Bluetooth transceiver 210 by increasing its receiving sensitivity and transmission power. The RF front end system 220 may include a RF sampling block 222, a RF switching logic 224, one or more RF switching blocks (e.g., 225 and 226), RF transmission gain block 228, and one or more RF receiving gain blocks (e.g., 229 and 230).

The RF sampling block 222 is coupled to the Bluetooth transceiver 210 and samples the RF signal received from the Bluetooth transceiver 210. For example, a small portion of the RF signal (e.g., less than 1%) outputted from the Bluetooth transceiver 210 may be passed to the RF sampling block 222, and the remaining portion of the RF signal outputted from the Bluetooth transceiver 210 may be passed to the RF switching block 225 for transmitting to the antenna 240. In other words, the RF sampling block 222 samples the RF signal outputted from the Bluetooth transceiver 210 at a rate substantially lower than that of the RF signals flowing to the antenna 240. The RF sampling block 222 converts the sampled RF signal into voltage signal and outputs the voltage signal to the RF switching logic 224. In some embodiments, the RF sampling block 222 may include a low pass filter that filters the voltage signal before sending it to the RF switching logic 224. The filtered voltage signal may also be converted into logarithmic signals for passing to the RF switching logic 224.

The RF switching logic 224 is coupled to the RF sampling block 222 to receive the voltage signals and switches the RF front end system 220 between a transmitting mode and a receiving mode. For example, the RF switching logic 224 may send control signals to the RF switching blocks 225 and 226 to switch the RF front end system 220 between the transmitting mode and the receiving mode based on the voltage signals received from the RF sampling block 222. The control signals may be sent from the RF switching logic 224 to the RF switching blocks 225 and 226 within hundreds of nanoseconds. In some embodiments, the RF switching logic 224 may compare the received voltage signal to a predetermined threshold, and if the voltage signal is greater than the predetermined threshold, switch the RF front end system 220 to the transmitting mode.

The RF transmission gain block 228 is configured to increase signal power of the RF signal received from the Bluetooth transceiver 210. The RF transmission gain block 228 may be enabled or disabled by the RF switching logic 224. For example, the RF switching logic 224 may be connected with the RF transmission gain block 228 and may send control signal to the RF transmission gain block 228 to enable or disable the RF transmission gain block 228. In some embodiments, the RF transmission gain block 228 may include a ceramic filter and step RF attenuator to shape the RF signal received from the Bluetooth transceiver 210 before amplifying the RF signal.

The RF receiving gain blocks 229 and 230 are configured to suppress the noise figure of the receiving chain. The RF receiving gain blocks 229 and 230 may be enabled or disabled by the RF switching logic 224. For example, the RF switching logic 224 may be connected with the RF receiving gain blocks 229 and 230 and may send control signals to the RF receiving gain blocks to enable or disable the RF receiving gain blocks 229 and 230. As illustrated in the Friis formula, the total noise factor of a cascade of stages is given as:

$$F_{total} = F_1 + \frac{F_2 - 1}{G_1} + \frac{F_3 - 1}{G_1 G_2} + \frac{F_4 - 1}{G_1 G_2 G_3} + \ldots + \frac{F_n - 1}{G_1 G_2 \ldots G_{n-1}}$$

where $F_i$ and $G_i$ are the noise factor and available power gain, respectively, of the i-th stage, and n is the number of stages. It can be seen that the overall noise figure of RF receiver is primarily established by the noise figure of its first gain stage. Consequently, a cascade of RF receiving gain blocks, such as the RF receiving gain blocks 229 and 230, may be used to further lower the noise figure of the RF front end system 220. Although two RF receiving gain blocks 229 and 230 are used in FIG. 2, it is also possible to use more or less number of RF receiving gain blocks in the RF front end system 220.

As shown in FIG. 2, the RF front end system 220 includes two RF switching blocks 225 and 226. The RF switching blocks are controlled by the control signal from the RF switching logic 224. The two RF switching blocks 225 and 226 each may be a single pole double throw (SPDT) switch which decides the path of the RF signal. If the RF switching blocks switch to the transmission path, the RF signal flows through the RF transmission gain block 228 and feeds into the antenna 240. If the RF switching blocks switch to the receiving path, the RF signal flows from the antenna through the RF receiving gain blocks and feeds into the Bluetooth transceiver 210. Although two RF switching blocks 225 and 226 are used in FIG. 2, it is also possible to use more or less number of RF switching blocks 225 and 226 in the RF front end system 220 to switch the path of the RF signal. Additionally, higher numbers of RF switching blocks may be used for implementing a more complicated architecture, such as a SP3T, SP4T or SPNT switching block.

A person having ordinary skill in the art should appreciate that the above described Bluetooth hub 200 can be modified to apply to scenarios where other wireless communication protocols are used. For example, the Bluetooth transceiver 210 in FIG. 2 may be replaced by a transceiver capable of transmit and receive signals of other wireless communication protocols, such as WIFI, and the resulting hub 200 would be capable of supporting communications between devices using other wireless communication protocols. It should be noted that the Bluetooth hub 200 may also be called as a Bluetooth router, and in this disclosure, the terms of Bluetooth hub and Bluetooth router are inter-exchangeable.

Figure 3:
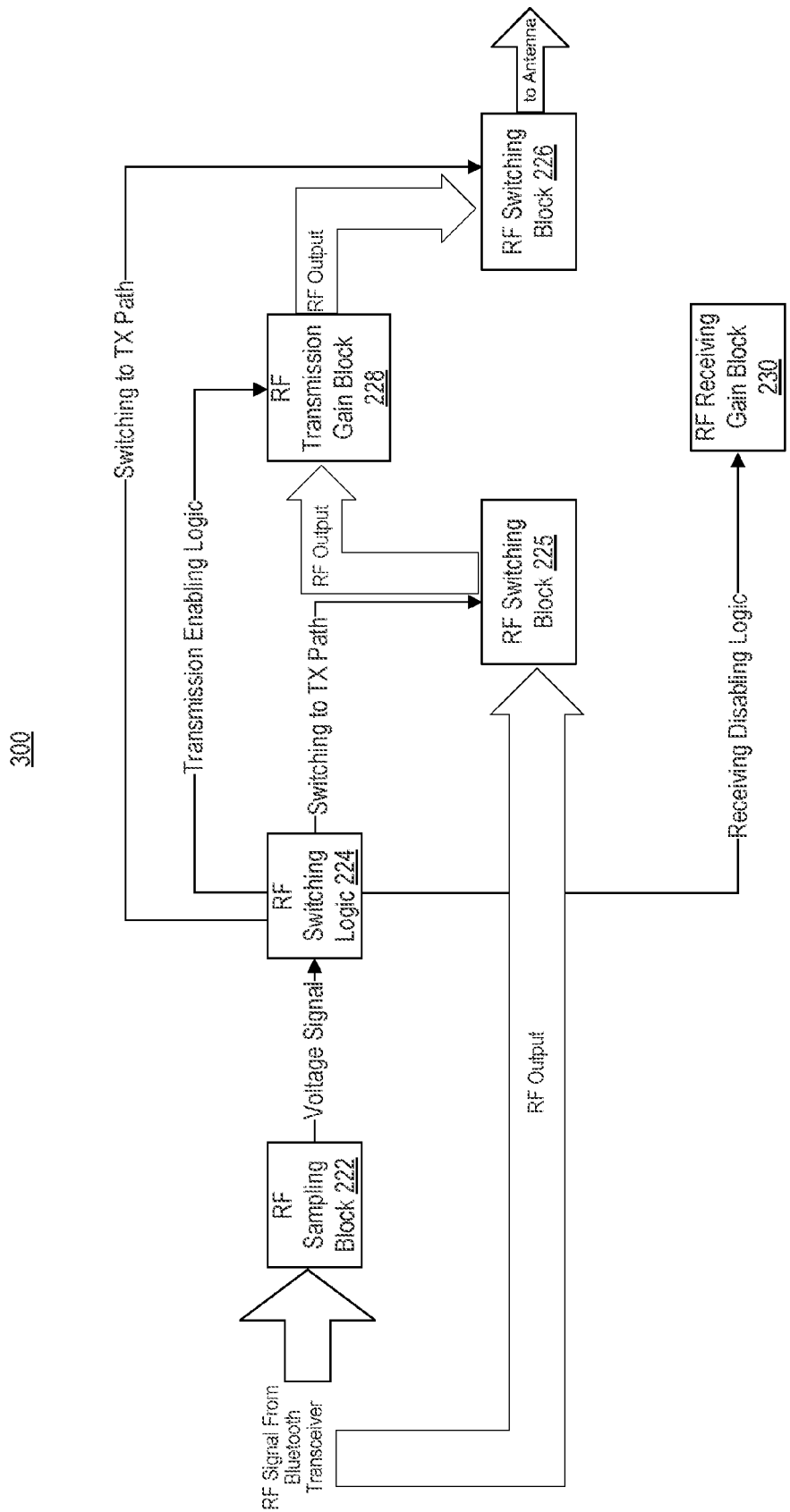
FIG. 3 illustrates an exemplary block diagram of a transmission path of a Bluetooth hub, in accordance with an embodiment of the present disclosure.

FIG. 3 illustrates an exemplary block diagram of a transmission (TX) path 300 of a Bluetooth hub, in accordance with an embodiment of the present disclosure. As shown in FIG. 3, during transmission of Bluetooth signals, the Bluetooth transceiver 210 sends RF signal to the RF front end system 220. A small portion of the RF signal outputted from the Bluetooth transceiver 210 is fed into the RF sampling block 222, and the remaining portion of the RF signal is fed into the RF switching block 225. For example, the RF sampling block 222 may take approximately 1% of the RF energy outputted from the Bluetooth transceiver 210 and convert the sampled RF signal into voltage signal. The RF sampling block 222 passes the voltage signal into the RF switching logic 224 for controlling the operation mode the RF front end system 220. In some embodiments, the RF switching logic 224 may compare voltage of the received voltage signal to a predetermined threshold, and if the voltage is greater than the predetermined threshold, the RF switching logic 224 may switch the RF front end system 220 to the transmitting mode. In the transmitting mode, the RF switching logic 224 sends control signal to RF switching blocks 225 and 226 to switch the RF signal to the transmission path and sends transmission enabling logic to the RF transmission gain block 228. The transmission enabling logic enables the RF transmission gain block 228 to perform the signal amplifying functionalities on the RF signal. The RF switching logic 224 may also send receiving disabling logic to RF receiving gain blocks (e.g., 229 and 230). The receiving disabling logic disables the RF receiving gain blocks to perform any noise suppression functionalities since no RF signal is passed to the RF receiving gain blocks when the RF front-end system 220 is in the transmitting mode. The RF signal outputted from the Bluetooth transceiver 210 is passed to the RF transmission gain block 228 and then fed to the antenna.

Figure 4:
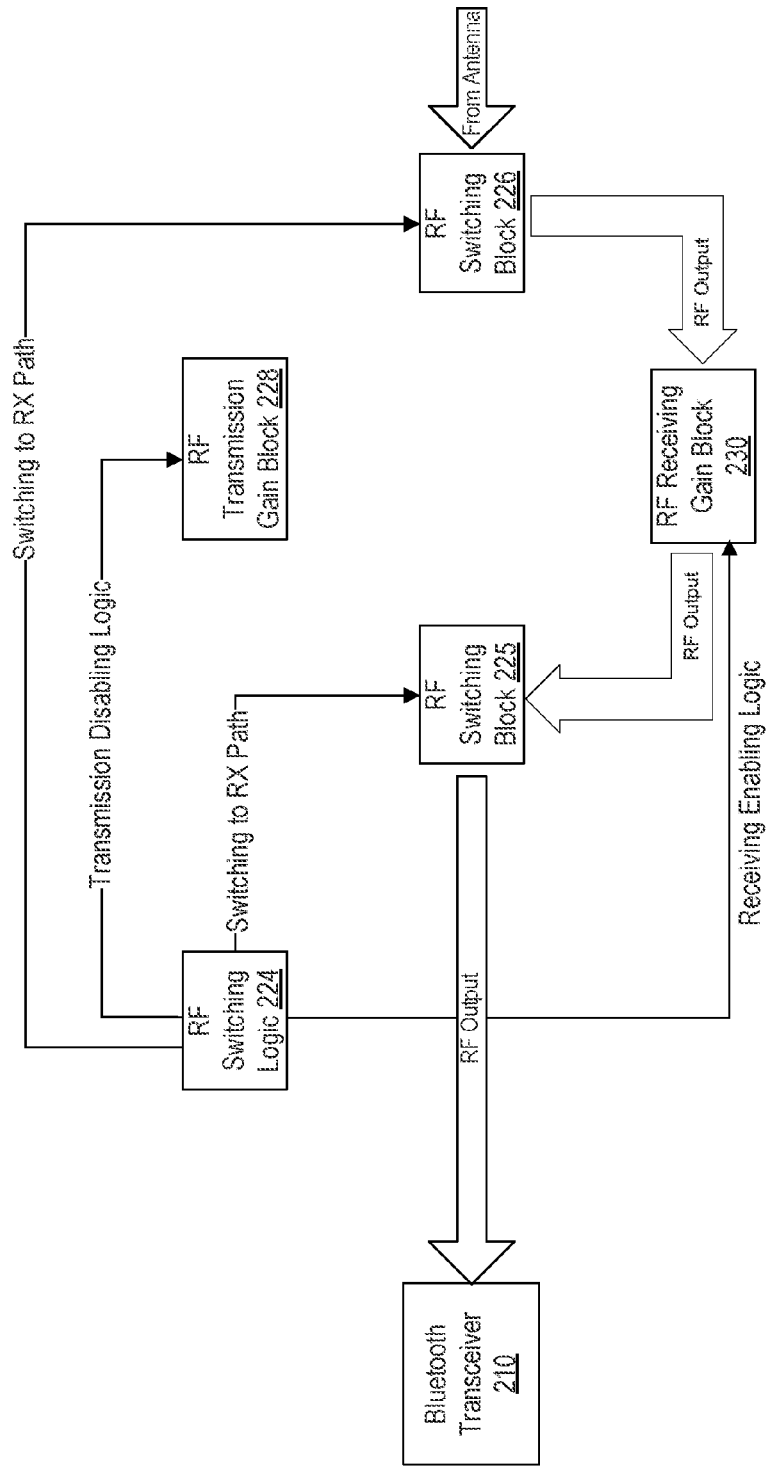
FIG. 4 illustrates an exemplary block diagram of a receiving path of a Bluetooth hub, in accordance with an embodiment of the present disclosure.

FIG. 4 illustrates an exemplary block diagram of a receiving (RX) path 400 of a Bluetooth hub, in accordance with an embodiment of the present disclosure. For example, the RF switching logic 224 may compare voltage of the voltage signal received from the RF sampling block 222 to a predetermined threshold, and if the voltage is lower than the predetermined threshold, the RF switching logic 224 may switch the RF front end system 220 to the receiving mode. In the receiving mode, the Bluetooth transceiver 210 stops transmitting RF energy into the RF front end system 220, and the RF switching logic 224 switches the RF signal to the receiving path. The RF signal received from the antenna is fed into the RF receiving gain blocks (e.g., 229 and 230) and inputted into the Bluetooth transceiver 210. The received signal may bypass the RF sampling block 222.

As shown in FIG. 4, during receiving of Bluetooth signal, the RF switching logic 224 sends control signal to RF switching blocks 225 and 226 to switch the RF signal to the receiving path and sends receiving enabling logic to the RF receiving gain blocks (e.g., 229 and 230). The receiving enabling logic enables the RF receiving gain block 230 to perform noise suppression functionalities on the RF signal received from the antenna. The RF switching logic 224 may also send transmission disabling logic to RF transmission gain block 228. The transmission disabling logic disables the RF transmission gain block 228 to perform any signal amplifying functionalities since no RF signal is passed to the RF transmission gain block 228 when the RF front-end system 220 operates in the receiving mode. The RF signal outputted from the antenna is passed to the RF transmission receiving gain block 230 and then fed into the Bluetooth transceiver 210 for decoding of the Bluetooth signal. The Bluetooth transceiver 210 stops transmitting RF energy to the RF front end system 220 when the front-end RF system 200 operates in the receiving mode. Thus, the RF sampling block 222 does not receive the RF signal from the Bluetooth transceiver 210 or provide any output to the RF switching logic 224 when the RF front-end system 220 operates in the receiving mode. The receiving path of the Bluetooth hub bypasses the RF sampling block 222 and the RF transmission gain block 228 when the RF front-end system 220 operates in the receiving mode.

Figure 5:
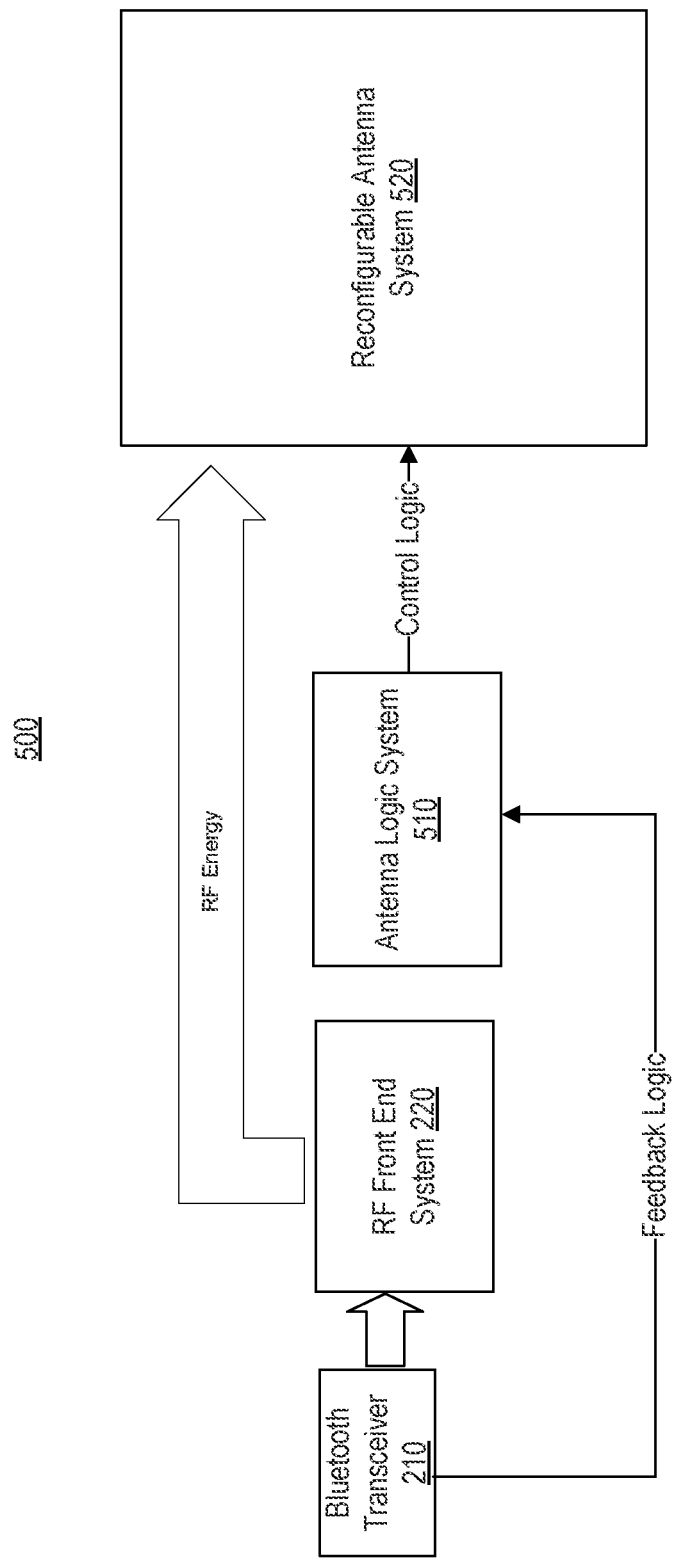
FIG. 5 illustrates an exemplary block diagram of a Bluetooth hub, in accordance with an embodiment of the present disclosure.

FIG. 5 illustrates an exemplary block diagram of a Bluetooth hub 500, in accordance with an embodiment of the present disclosure. As shown in FIG. 5, the Bluetooth hub 500 includes a Bluetooth transceiver 210, a RF front end system 220, an antenna logic system 510, and a reconfigurable antenna system 520. The Bluetooth transceiver 210 and RF front end system 220 have been described above in connection with FIGS. 2-4.

The reconfigurable antenna system 520 may include a plurality of antenna elements, and each of the antenna elements may be turned on or off independently. Thus, a unique antenna radiation pattern may be formed by turning on or off each of the antenna elements. In other words, different antenna configurations may be produced by turning on or off each of the antenna elements. The reconfigurable antenna system 520 may be configured by the antenna logic system 510 with a specific antenna configuration of the antenna elements.

The antenna logic system 510 includes a feedback logic input port connected to the Bluetooth transceiver 210 and a control logic output port connected to the reconfigurable antenna system 520. In some embodiments, during an initialization stage, the reconfigurable antenna system 520 may scan through each of the antenna configurations. The Bluetooth transceiver 210 (or a processor associated with the Bluetooth transceiver 210) may generate a received signal strength indicator (RSSI) for each of the antenna configurations based on signals received from Bluetooth client devices. The antenna logic system 510 may receive feedback from the Bluetooth transceiver 210, including the RSSI of each of the antenna configurations for each client device.

For each of the Bluetooth client devices, the antenna logic system 510 may select a preferred antenna configuration based on the RSSIs and configure the reconfigurable antenna system 520 with the preferred antenna configuration for the corresponding client device. For example, the antenna logic system 510 may select an antenna configuration corresponding to the highest RSSI among all the antenna configurations. In some embodiments, the antenna logic system 510 may take into account both the RSSI and the prior selected antenna configuration in deciding which antenna configuration to select for the client device. In some embodiments, the antenna logic system 510 may take into account the RSSI, the bit error rate (BER), the packet error rate (PER), and/or the noise floor of the communication path in deciding which antenna configuration to select for the client device. By selecting the antenna configuration based on the feedback provided by the Bluetooth transceiver 210, the reconfigurable antenna system 520 may achieve higher antenna gain and receive less noise, thereby increasing the communication range of the Bluetooth client devices.

A person having ordinary skill in the art should appreciate that the above described Bluetooth hub 500 can be modified to apply to scenarios where other wireless communication protocols are used. For example, the Bluetooth transceiver 210 in FIG. 5 may be replaced by a transceiver capable of transmit and receive signals of other wireless communication protocols, and the resulting hub 500 would be capable of supporting communications between devices using other wireless communication protocols. Certain functional blocks may be omitted in the Bluetooth hub 500 without departing from the scope and spirit of the present disclosure. For example, in some implementations, the RF front end system 200 may be omitted in the Bluetooth hub 500, and the RF energy may flow directly from the Bluetooth transceiver 210 to the reconfigurable antenna system 520.

Figure 6:
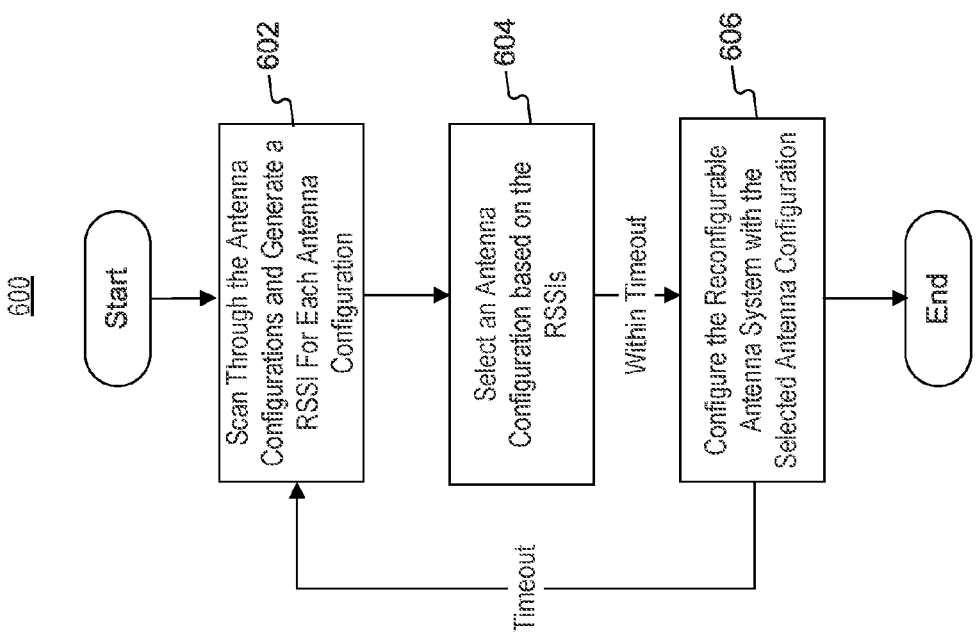
FIG. 6 is a flowchart of an exemplary method for configuring an antenna system of a Bluetooth hub, in accordance with an embodiment of the present disclosure.

FIG. 6 is a flowchart of an exemplary method 600 for configuring an antenna system of a Bluetooth hub, in accordance with an embodiment of the present disclosure. The method 600 may be performed by the Bluetooth hub 500 described above in connection with FIG. 5.

At step 602, the Bluetooth hub scans through the different antenna configurations and generates a corresponding RSSI for each of the antenna configurations. For example, during an initialization stage, the reconfigurable antenna system 520 may scan through the antenna configurations, and the Bluetooth transceiver 210 (or a processor associated with the Bluetooth transceiver 210) may generate the RSSI corresponding to each of the antenna configurations. If there is a plurality of Bluetooth client devices in the system, the Bluetooth hub may generate a set of RSSIs for each of the client devices. The Bluetooth transceiver 210 (or a processor associated with the Bluetooth transceiver 210) may feedback the RSSIs to the antenna logic system 510 for selection of the antenna configuration. In some embodiments, a processor of the Bluetooth hub may select an antenna configuration based on the RSSIs and feedback the selected antenna configuration to the antenna logic system 510.

FIG. 7 illustrates an exemplary table 700 of RSSIs for selecting an antenna configuration, in accordance with an embodiment of the present disclosure. The table 700 illustrates the sets of RSSIs collected by the Bluetooth hub during the initialization stage. As shown in FIG. 7, for each of the N antenna configurations, the table 700 includes RSSIs for a plurality of Bluetooth client devices, i.e., client A to client X. As the client devices may move around and the RF environment may be changing, the table 700 may be updated periodically to reflect the current RF condition of the Bluetooth client devices.

Referring back to FIG. 6, at step 604, the Bluetooth hub selects an antenna configuration for the client devices based on RSSIs. For each client device, a same or different antenna configuration may be selected. For example, the Bluetooth hub may select the antenna configuration with the highest RSSI among all the antenna configurations for each client device. For another example, the Bluetooth hub may select the prior antenna configuration if the RSSI corresponding to the prior antenna configuration remains above a predetermined value. If the RSSI corresponding to the prior antenna configuration falls below a predetermined value, the corresponding antenna configuration with the highest RSSI among all the antenna configurations may be selected. It is also possible that other types of signal strength indicator may be used in place of the RSSI for selecting the preferred antenna configuration.

At step 606, the Bluetooth hub configures the reconfigurable antenna system 520 with the selected antenna configuration, and the selected antenna configuration is used to communicate with the corresponding Bluetooth client device. For example, the antenna logic system 510 may configure the reconfigurable antenna system 520 with the selected antenna configuration via the control logic output port. The selected antenna configuration may be used to communicate with the corresponding Bluetooth client device within a timeout, that is, a predetermined time period. After the timeout, the method 600 may return to step 602 to scan through the antenna configurations and obtain updated RSSIs for each of the antenna configurations. In some embodiments, the timeout may be set to a value less than one second, for example, 300 ms. The antenna logic system 510 may update the selected antenna configuration based on the updated RSSIs. Thus, a selected antenna configuration is used to communicate with a client device for a predetermined time period, and the selected antenna configuration is updated after the predetermined time period to reflect the current RF channel conditions. By selecting the antenna configuration based on the RSSI and update the selected antenna configuration periodically, the method 600 achieves higher antenna gain and lower noise, and as a result, increases the communication range of the client devices.

Figure 8:
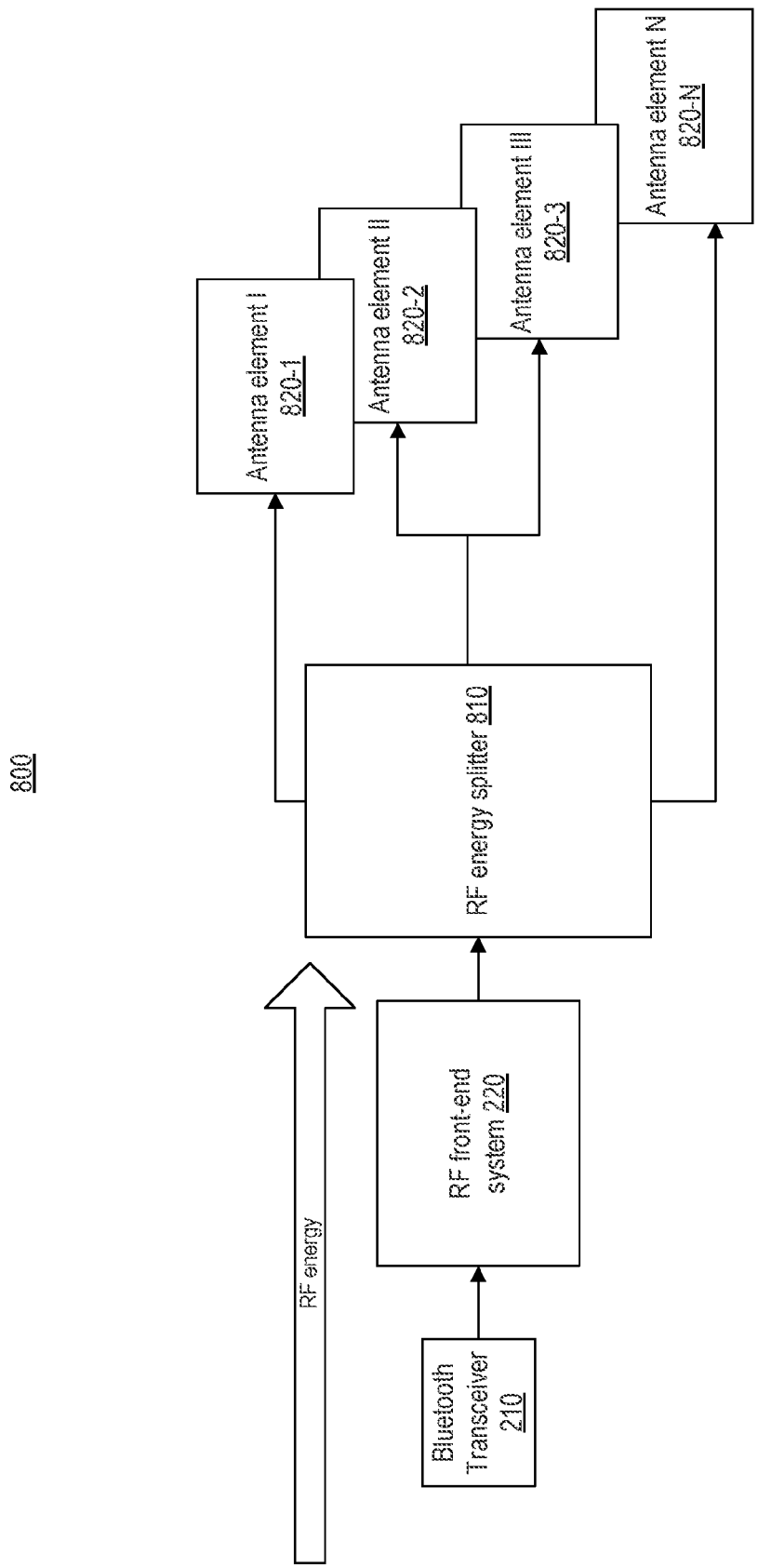
FIG. 8 illustrates an exemplary block diagram of an antenna system of a Bluetooth hub, in accordance with an embodiment of the present disclosure.

FIG. 8 illustrates an exemplary block diagram of a Bluetooth hub 800, in accordance with an embodiment of the present disclosure. As shown in FIG. 8, the Bluetooth hub 800 includes a Bluetooth transceiver 210, a RF front end system 220, a RF energy splitter 810, and a plurality of antenna elements 820-1 to 820-N. The Bluetooth transceiver 210 and RF front end system 220 have been described above in connection with FIGS. 2-4.

The RF energy splitter 810 is coupled with the RF front end system 220, and the RF energy flows from the RF front end system 220 to the RF energy splitter 810. The RF energy splitter 810 is configured to divide the RF energy, for example, equally, into N parts and feed the split RF energy into each of the N directional antenna elements 820-1 to 820-N. Each of the directional antenna elements 820-1 to 820-N may be configured to radiate in a different direction, and the combination of all the antenna elements may cover the entire area of the network. For example, each of the directional antenna elements 820-1 to 820-N may be configured to radiate in a direction towards 1/N part of the area. In doing so, higher antenna gain may be achieved for the Bluetooth hub in comparison with those using omni-directional antennas.

In some embodiments, the Bluetooth hub may determine, for a particular Bluetooth device, which directional antenna element receives the strongest signal from that Bluetooth device. The Bluetooth hub may determine that the Bluetooth device falls in an area covered by that directional antenna element, and use that directional antenna element to transmit RF signals for the Bluetooth device. For example, the Bluetooth hub may feed all of the RF energy for the Bluetooth device to that directional antenna element, instead of equally dividing the RF energy to all the antenna elements.

A person having ordinary skill in the art should appreciate that the above described Bluetooth hub 800 can be modified to apply to scenarios where other wireless communication protocols are used. For example, the Bluetooth transceiver 210 in FIG. 8 may be replaced by a transceiver capable of transmit and receive signals of other wireless communication protocols, and the resulting hub 800 would be capable of supporting communications between devices using other wireless communication protocols. Certain functional blocks may be omitted in the Bluetooth hub 900 without departing from the scope and spirit of the present disclosure. For example, in some implementations, the RF front end system 200 may be omitted in the Bluetooth hub 800, and the RF energy may flow directly from the Bluetooth transceiver 210 to the RF energy splitter 810.

Figure 9:
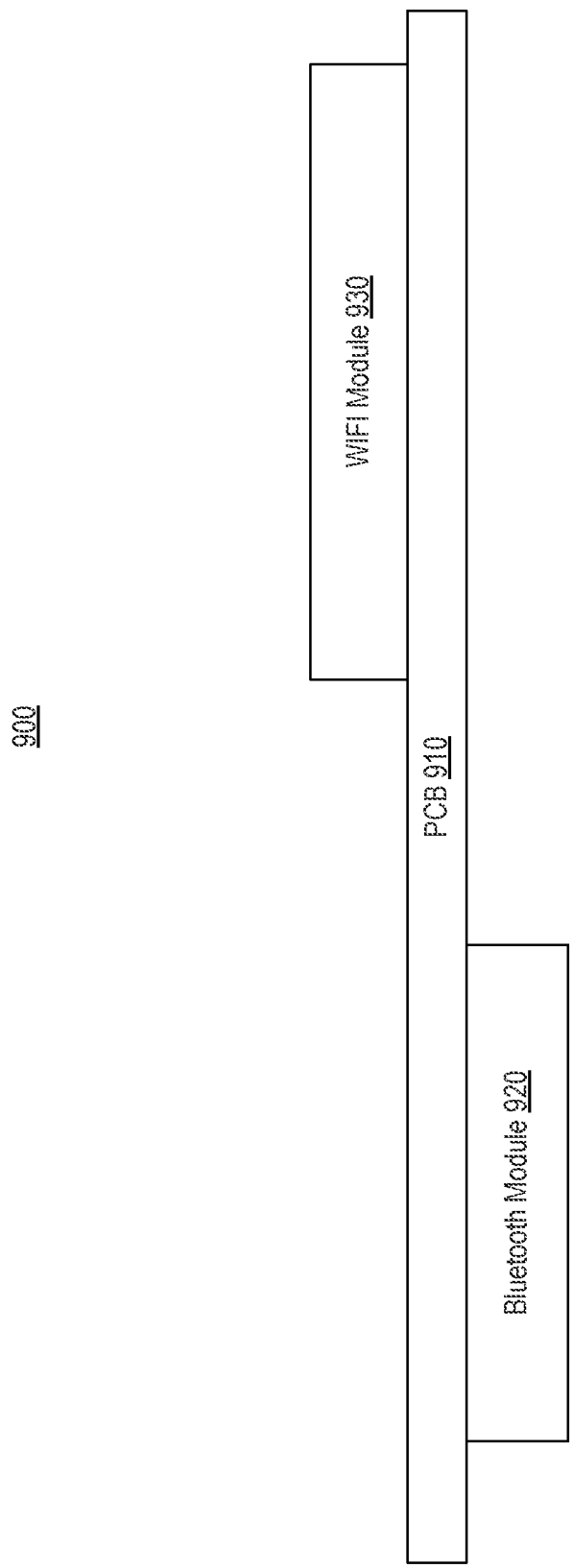
FIG. 9 illustrates an exemplary block diagram of a wireless communication hub capable of supporting multiple communication protocols, in accordance with an embodiment of the present disclosure.

FIG. 9 illustrates an exemplary block diagram of a wireless communication hub 900 capable of supporting multiple communication protocols, in accordance with an embodiment of the present disclosure. As shown in FIG. 9, the wireless communication hub 900 includes a printed circuit board (PCB) 910, a Bluetooth module 920, and a WIFI module 930 for supporting both Bluetooth and WIFI communications.

Since both the WIFI devices and Bluetooth devices operate at the industrial, scientific and medical (ISM) radio bands, there may exist internal interferences between the Bluetooth module 920 and the WIFI module 930 within the wireless communication hub 900. To minimize the interference between the Bluetooth module 920 and the WIFI module 930, the Bluetooth module 920 and the WIFI module 930 may be placed apart on the PCB 910, for example, at opposite ends of the PCB 910. As shown in FIG. 9, the Bluetooth module 920 and the WIFI module 930 may be also placed at opposite sides of the PCB 910. In some embodiments, the physical distance between the Bluetooth module 920 and the WIFI module 930 may be configured to be greater than a predetermined distance to ensure isolation between them.

It should be understood that although a WIFI module and a Bluetooth module are included in FIG. 9, similar arrangement can be applied to wireless communication hubs supporting other communication protocols. For example, in some implementations, the wireless communication hub may include a Bluetooth module and a Zigbee module, and the Bluetooth module and Zigbee module may be placed apart on the PCB, for example, at an opposite end of the PCB, to reduce interference to each other. As another example, the wireless communication hub may include a Bluetooth module, a WIFI module, and a Zigbee module, and the three modules may be placed apart on the PCB with a minimum physical distance between one another to reduce interference to one another.

Figure 10:
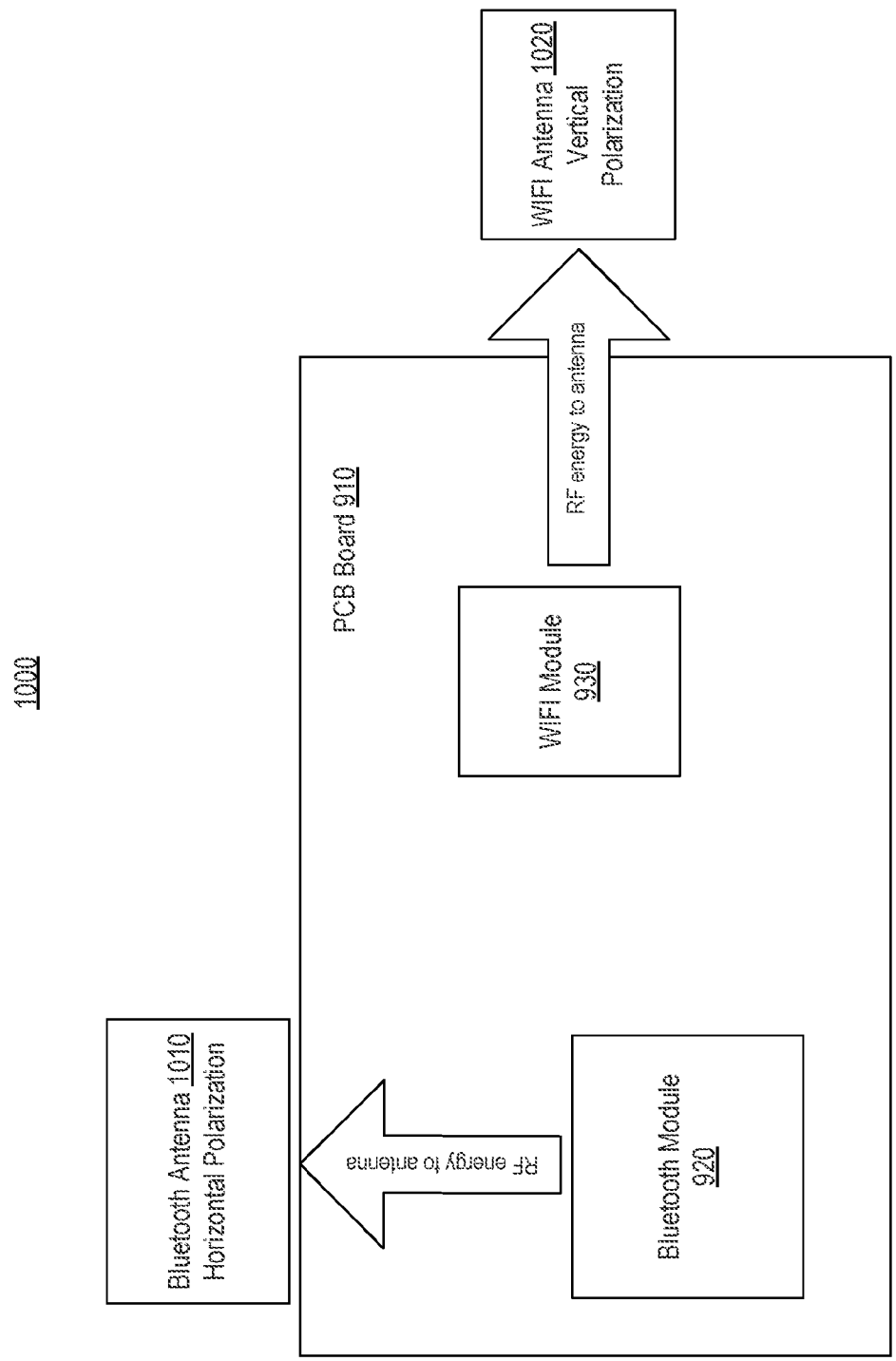
FIG. 10 illustrates an exemplary block diagram of a wireless communication hub capable of supporting multiple communication protocols, in accordance with an embodiment of the present disclosure.

FIG. 10 illustrates an exemplary block diagram of a wireless communication hub 1000 capable of supporting multiple communication protocols, in accordance with an embodiment of the present disclosure. As shown in FIG. 10, the wireless communication hub 1000 includes a printed circuit board (PCB) 910, a Bluetooth module 920, a Bluetooth antenna 1010, a WIFI module 930, and a WIFI antenna 1020 for supporting both Bluetooth and WIFI communications.

Since both the WIFI devices and Bluetooth devices operate at the ISM radio bands, to minimize the interference between the Bluetooth module 920 and the WIFI module 930, the Bluetooth module 920 and the WIFI module 930 may be placed apart on the PCB 910, for example, by having a physical distance greater than a predetermined minimum distance.

In some embodiments, interference between the communication modules may be reduced by using different antenna polarizations and PCB RF paths between each communication modules. As shown in FIG. 10, the Bluetooth antenna 1010 is configured to have a horizontal polarization, and the WIFI antenna 1020 is configured to have a vertical polarization. Additionally, the PCB RF path to the Bluetooth antenna 1010 is in a vertical direction, and the PCB RF path to the WIFI antenna 1020 is in a horizontal direction. Reduced interference between the Bluetooth module 920 and the WIFI module 930 may be achieved by the different polarizations of the Bluetooth antenna and WIFI antenna and the different directions of PCB RF paths between the Bluetooth module and the WIFI module.

In some embodiments, interference between the communication modules may be reduced by using time-domain isolation. For example, a processor (e.g., a CPU) of the wireless communication hub may function as a communication controller and execute a timing algorithm to determine the time slots for each of the communication module to transmit and/or receive data. When the WIFI module is transmitting and/or receiving data, the processor may send control signal to the Bluetooth module such that the Bluetooth module refrains from transmission at the same time when the WIFI module is transmitting and/or receiving data. Similarly, when the Bluetooth module is transmitting and/or receiving data, the processor may send control signal to the WIFI module such that the WIFI module refrains from transmission at the same time when the Bluetooth module is transmitting and/or receiving data.

It should be understood that although a WIFI module and a Bluetooth module are included in FIG. 10, similar arrangement can be applied to wireless communication hubs supporting other communication protocols. For example, in some implementations, the wireless communication hub may include a Bluetooth module and a Zigbee module, and the Bluetooth antenna and Zigbee antenna may be configured to have different polarizations. As another example, the Bluetooth module and Zigbee module may be configured to transmit and/or receive at different time slots to avoid interference to each other.

Figure 11:
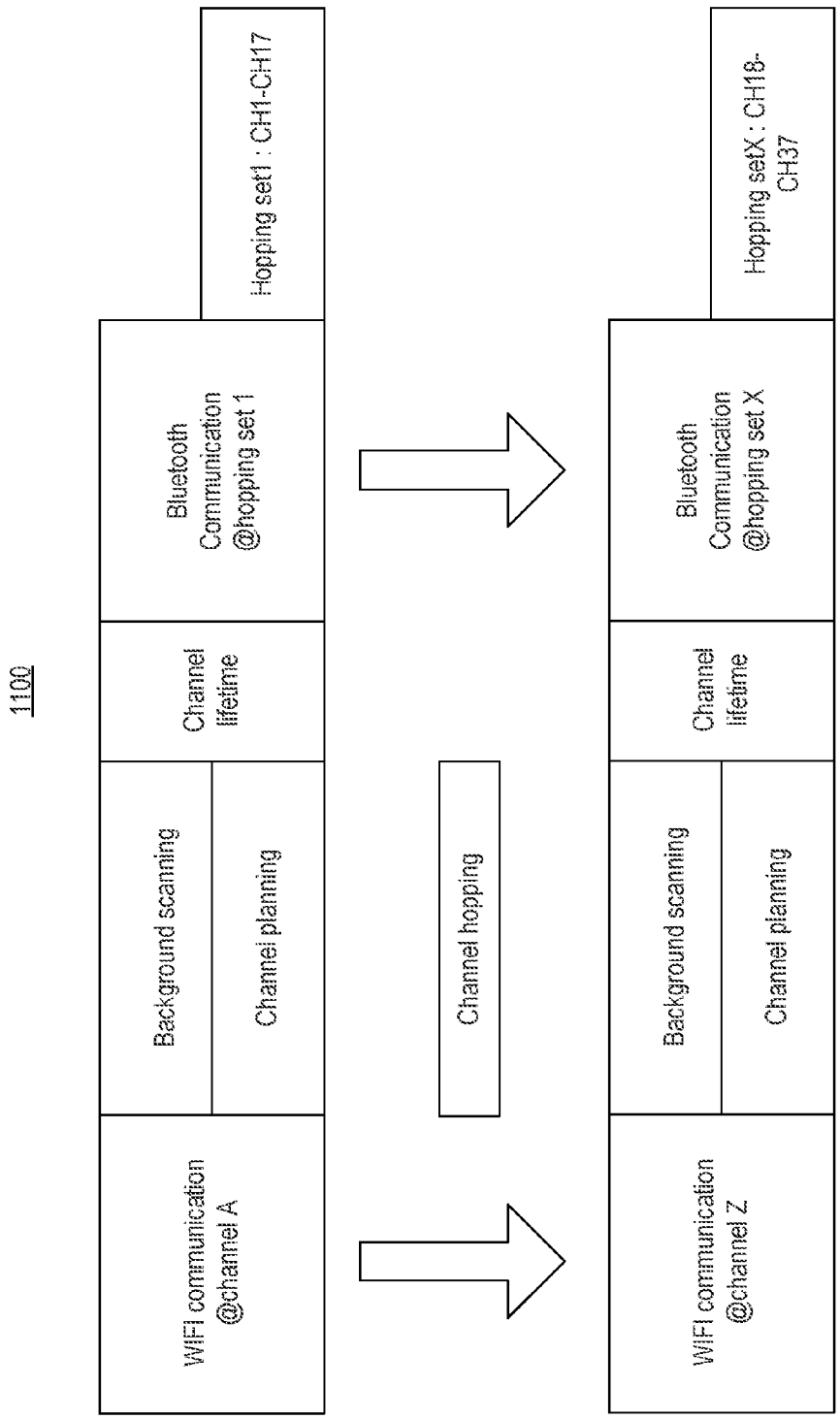
FIG. 11 illustrates an exemplary diagram of a frequency hopping scheme employed by a wireless communication hub capable of supporting multiple communication protocols, in accordance with an embodiment of the present disclosure.

FIG. 11 illustrates an exemplary diagram of a frequency hopping scheme 1100 employed by a wireless communication hub capable of supporting multiple communication protocols, in accordance with an embodiment of the present disclosure. Frequency-domain isolation may be achieved by implementing a master frequency hopping algorithm by a processor (e.g., a CPU) of the wireless communication hub. For example, the processor of the wireless communication hub may perform a background scanning of the entire bandwidth of the WIFI channel and the Bluetooth channel to select frequency channel of the WIFI communication and Bluetooth communication at the next hopping cycle.

As shown in FIG. 11, at the first frequency hopping cycle, the WIFI communication is scheduled at channel A, and the Bluetooth communication is scheduled at frequency channel set 1, i.e., channels 1-17. By using different frequency channels, the interference between the WIFI communication and the Bluetooth communication is minimized. The scheduled frequency channels for the WIFI communication and the Bluetooth communication are used in one frequency hopping cycle for a predetermined time period. During one frequency hopping cycle, the scheduled frequency channels for the WIFI communication and the Bluetooth communication remain unchanged.

At the next hopping cycle, different frequency channels for the WIFI communication and the Bluetooth communication may be used. As shown in FIG. 11, at the second frequency hopping cycle, the WIFI communication is scheduled at channel Z, and the Bluetooth communication is scheduled at frequency channel set X, i.e., channels 18-37. That is, the frequency channels used by the WIFI communication and the Bluetooth communication may vary from time to time, while at a given time instant, the frequency channels used by the WIFI communication and the Bluetooth communication are not overlapping in order to minimize the interference to each other. During each of the frequency hopping cycle, the processor of the wireless communication hub may perform a background scanning of the entire bandwidth of the WIFI channel and the Bluetooth channel to select frequency channel of the WIFI communication and Bluetooth communication for the next hopping cycle or future hopping cycles. In some implementations, since the Bluetooth communication protocol includes the frequency hopping feature, the processor of the wireless communication hub may determine a set of hopping frequencies for the Bluetooth communication, and the Bluetooth protocol stack which implements the functionalities of higher layers of Bluetooth protocol may determine the exact hopping channels for Bluetooth communication.

It should be understood that although WIFI communication and Bluetooth communication are described in connection with FIG. 11, the above described frequency hopping mechanism can be applied to other wireless communication protocols without departing from the scope and spirit of the present disclosure.

The specification has described methods, devices, and systems for increasing wireless communication range. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope and spirit of disclosed embodiments being indicated by the following claims.

What is claimed is:

1. A device for supporting wireless communication, comprising:
 a first antenna and a second antenna, wherein the first antenna uses a first polarization, and the second antenna uses a second polarization, wherein the first and second polarizations are different;
a first communication module configured to transmit radio frequency (RF) energy to the first antenna via a first RF energy path and transmit a first radio frequency signal at a first radio frequency via the first antenna, wherein the first radio frequency signal is generated complying with a first communication protocol; and
a second communication module configured to transmit RF energy to the second antenna via a second RF energy path and transmit a second radio frequency signal at a second radio frequency via the second antenna, wherein:
the second radio frequency signal is generated complying with a second communication protocol different from the first communication protocol;
the first communication module and the second communication module are located at an opposite side of a circuit board; and
the first RF energy path is substantially orthogonal to the second RF energy path.

2. The device of claim 1, wherein the first antenna and second antenna are located outside the circuit board.

3. The device of claim 1, wherein the first communication module transmits the first radio frequency signal at a first time, and the second communication module transmits the second radio frequency signal at a second time different from the first time.

4. The device of claim 1, wherein the first communication module is a Bluetooth module and the second communication module is a WIFI module.

5. The device of claim 1, wherein the first frequency and the second frequency change after a predetermined time period.

6. The device of claim 1, wherein:
the first communication module is physically separated from the second communication module by a predetermined minimum distance.

7. The device of claim 1, wherein:
the first antenna and the second antenna use substantially orthogonal polarizations.

8. A device for supporting wireless communication, comprising:
a first antenna and a second antenna, wherein the first antenna uses a first polarization, and the second antenna uses a second polarization, wherein the first and second polarizations are different;
a first communication module configured to transmit radio frequency (RF) energy to the first antenna via a first RF energy path and transmit a first radio frequency signal at a first radio frequency via the first antenna, wherein the first radio frequency signal is generated complying with a first communication protocol; and
a second communication module configured to transmit RF energy to the second antenna via a second RF energy path and transmit a second radio frequency signal via the second antenna wherein the second antenna is configured to transmit at a second radio frequency, wherein:
the second radio frequency signal is generated complying with a second communication protocol different from the first communication protocol; and
the first RF energy path is substantially orthogonal to the second RF energy path.

9. The device of claim 8, wherein the first antenna and the second antenna are located outside the circuit board.

10. The device of claim 8, wherein the first communication module transmits the first radio frequency signal at a first time, and the second communication module transmits the second radio frequency signal at a second time different from the first time.

11. The device of claim 8, wherein the first communication module is a Bluetooth module and the second communication module is a WIFI module.

12. The device of claim 10, wherein the first frequency and the second frequency change after a predetermined time period.

13. The device of claim 8, wherein:
the first communication module is physically separated from the second communication module by a predetermined minimum distance.

14. The device of claim 8, wherein:
the first antenna and the second antenna use substantially orthogonal polarizations.

15. A method for supporting wireless communication, comprising:
transmitting radio frequency (RF) energy to a first antenna via a first RF energy path and RF energy to a second antenna via a second RF energy path, wherein the first antenna is configured to transmit at a first radio frequency and the second antenna is configured to transmit at a second radio frequency;
generating a first RF signal in compliance with a first communication protocol and a second RF signal in compliance with a second communication protocol; and
transmitting the first RF signal via the first antenna and the second RF signal via the second antenna, wherein
the first RF energy path is substantially orthogonal to the second RF energy path; and
the first antenna uses a first polarization and the second antenna uses a second polarization, wherein the first and second polarizations are different.

16. The device of claim 15, wherein the first antenna and the second antenna are located outside the circuit board.

17. The device of claim 15, wherein the first communication module transmits the first radio frequency signal at a first time, and the second communication module transmits the second radio frequency signal at a second time different from the first time.

18. The device of claim 15, wherein the first communication module is a Bluetooth module and the second communication module is a WIFI module.

* * * * *